US009804648B2

United States Patent
Kuo et al.

(10) Patent No.: US 9,804,648 B2
(45) Date of Patent: Oct. 31, 2017

(54) DOCKABLE DEVICE AND POWER METHOD THEREOF

(71) Applicant: Quanta Computer Inc., Kuei Shan Hsiang, Tao Yuan Shien (TW)

(72) Inventors: Hsin-Chih Kuo, Tao Yuan Shien (TW); Ming-Chieh Lee, Tao Yuan Shien (TW); Wen-Lan Yu, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 200 days.

(21) Appl. No.: 14/287,722

(22) Filed: May 27, 2014

(65) Prior Publication Data
US 2015/0248150 A1 Sep. 3, 2015

(30) Foreign Application Priority Data
Mar. 3, 2014 (TW) .............................. 103106957 A

(51) Int. Cl.
*G06F 1/26* (2006.01)
*G06F 1/16* (2006.01)

(52) U.S. Cl.
CPC ............ *G06F 1/263* (2013.01); *G06F 1/1632* (2013.01)

(58) Field of Classification Search
CPC .......... G06F 1/1632; G06F 1/263; G05F 1/46; H02J 7/00; H02J 2001/008; H02J 1/10; H02J 1/108; H02J 7/0065; H02M 2001/0032; H02M 2001/0003; H02M 2001/0016
See application file for complete search history.

(56) References Cited

U.S. PATENT DOCUMENTS

| 4,670,661 A | * | 6/1987 | Ishikawa | ................... H02J 9/06 307/43 |
| 4,675,538 A | * | 6/1987 | Epstein | ................... H02J 9/061 307/150 |
| 5,161,097 A | * | 11/1992 | Ikeda | ..................... G05F 1/563 323/222 |

(Continued)

FOREIGN PATENT DOCUMENTS

CN 103490459 1/2014

OTHER PUBLICATIONS

Patoka, Martin. "Fundamentals of Power System ORing | EE Times." EE Times Design How-To. EE Times, Mar. 21, 2007. Web. Accessed Mar. 10, 2016. <http://www.eetimes.com/document.asp?doc_id=1273175>.*

(Continued)

*Primary Examiner* — Phil Nguyen
*Assistant Examiner* — Brian J Corcoran
(74) *Attorney, Agent, or Firm* — McClure, Qualey & Rodack, LLP

(57) ABSTRACT

A dockable device and a power method thereof are provided. The dockable device includes a main device, a main device battery, a connector, a switch and a voltage down-converter. The connector may be coupled to a docking device. The switch, coupled to the main device battery, is configured to be closed to provide power to the main device from the main device battery. The voltage down-converter is configured to provide power with a backup voltage to the main device, wherein the backup voltage is less than a discharge voltage output by a fully discharged main device battery.

6 Claims, 4 Drawing Sheets

(56) References Cited

U.S. PATENT DOCUMENTS

| | | | | |
|---|---|---|---|---|
| 5,179,508 | A * | 1/1993 | Lange | H02J 7/0065 323/222 |
| 5,450,003 | A * | 9/1995 | Cheon | G06F 1/3203 323/272 |
| 5,773,959 | A * | 6/1998 | Merritt | H01M 10/441 320/117 |
| 6,452,362 | B1 * | 9/2002 | Choo | H02J 7/0013 320/116 |
| 7,345,451 | B2 * | 3/2008 | Chen | H02J 7/0073 320/128 |
| 7,525,281 | B2 * | 4/2009 | Koyanagi | B25J 19/005 320/107 |
| 7,893,560 | B2 * | 2/2011 | Carter | H02J 1/10 307/64 |
| 7,952,328 | B2 * | 5/2011 | Parker | G06F 1/263 320/112 |
| 2002/0030412 | A1 * | 3/2002 | Lucas | G06F 1/263 307/66 |
| 2002/0060498 | A1 * | 5/2002 | Higashiura | G06F 1/263 307/64 |
| 2003/0161099 | A1 * | 8/2003 | Aoki | G06F 1/1632 361/679.29 |
| 2005/0185352 | A1 * | 8/2005 | Nguyen | H02J 1/10 361/90 |
| 2006/0262579 | A1 * | 11/2006 | Chou | H02M 3/1582 363/63 |
| 2007/0222415 | A1 * | 9/2007 | Shah | H02J 9/061 320/107 |
| 2008/0252256 | A1 * | 10/2008 | Parker | H02J 7/0013 320/114 |
| 2010/0133908 | A1 * | 6/2010 | Weng | G06F 1/266 307/48 |
| 2010/0270863 | A1 * | 10/2010 | Togare | H02J 1/102 307/80 |
| 2011/0310689 | A1 * | 12/2011 | Hayden | G11O 5/147 365/226 |
| 2013/0328399 | A1 * | 12/2013 | Suzuki | G06F 1/1654 307/29 |
| 2014/0344588 | A1 * | 11/2014 | Chou | G06F 1/30 713/300 |

OTHER PUBLICATIONS

Chinese language office action dated Aug. 26, 2016, issued in application No. CN 201410119860.7.

* cited by examiner

DOCKABLE DEVICE AND POWER METHOD THEREOF

CROSS REFERENCE TO RELATED APPLICATIONS

This Application claims priority of Taiwan Patent Application No. 103106957, filed on Mar. 3, 2014, and the entirety of which is incorporated by reference herein.

BACKGROUND OF THE INVENTION

Field of the Invention

The present invention relates to a power system, and in particular relates to a dockable device and a power method thereof.

Description of the Related Art

In order to meet market demands, tablet computers and notebook computers not only have to be compact in size, but the portability also becomes an important concern in designing of tablet computers and notebook computers. As a result, detachable laptops or notebooks now become available on the market. The detachable laptops include two parts, that is, a tablet computer and a docking station. The tablet computer and docking station both have an independent battery. It has become a design consideration that what kind of battery charging behavior is convenient and friendly to end users. In some implementations, in the discharging mode, power will be provided to the system from a battery of the docking station until fully discharged, then a battery of the tablet computer will next supply power to the system. However, in an event of connecting or disconnecting the table computer from the docking station in an operation mode, this type of discharging behavior will result in a sudden power loss in the tablet computer.

BRIEF SUMMARY OF THE INVENTION

A detailed description is given in the following embodiments with reference to the accompanying drawings.

An embodiment of a dockable device is disclosed, including a main device, a main device battery, a connector, a switch and a voltage down-converter. The connector may be coupled to a docking device. The switch, coupled to the main device battery, is configured to be closed to provide power to the main device from the main device battery. The voltage down-converter is configured to provide power with a backup voltage to the main device, wherein the backup voltage is less than a discharge voltage output by a fully discharged main device battery.

Another embodiment of a power method is provided, adopted by a dockable device, wherein the dockable device comprises a main device dockable to a docking device. The power method includes: detecting whether a connector has been coupled to the docking device; and when the connector has not been coupled to the docking device, or a docking device battery of the docking device is fully discharged, closing a switch to provide power to the main device from a main device battery; and providing power with a backup voltage, by a voltage down-converter, to the main device, wherein the backup voltage is less than a discharge voltage output by a fully discharged main device battery.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
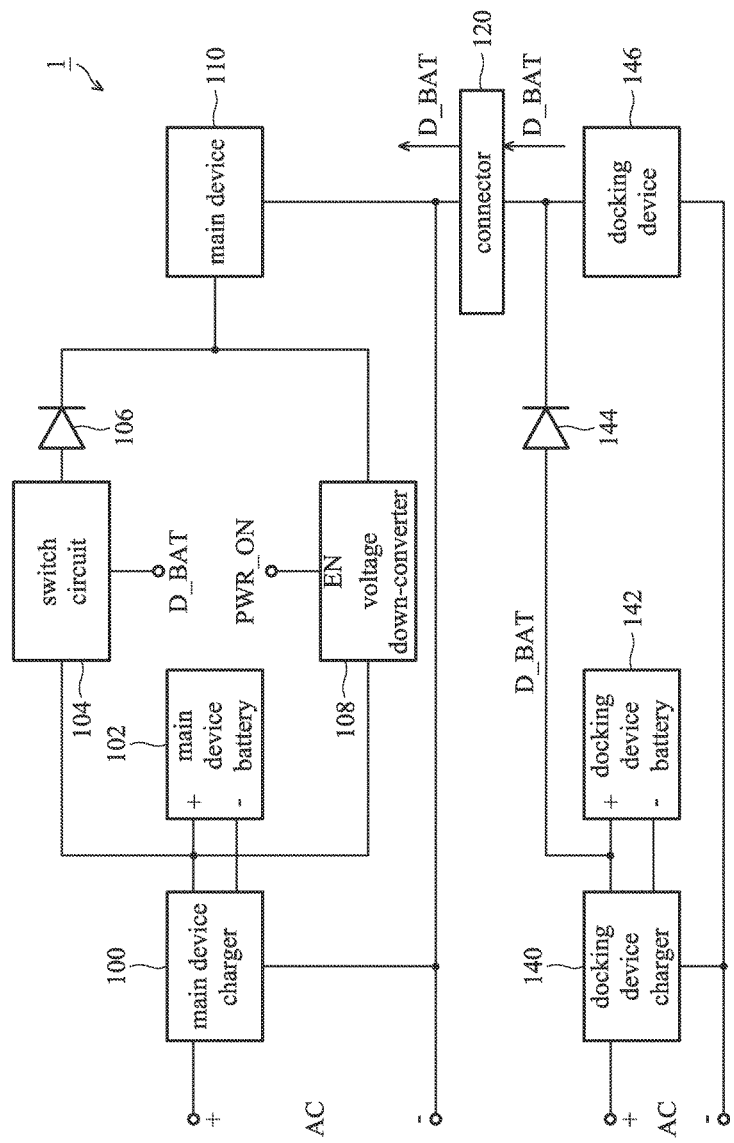
FIG. 1 is a block diagram of a dockable device 1 according an embodiment of the invention.

FIG. 1 is a block diagram of a dockable device 1 according an embodiment of the invention. The dockable device 1 includes a main device part and a docking device part. The main device part contains a main device charger 100, a main device battery 102, a switch circuit 104, a main device diode 106, a voltage down-converter 108, a main device 110, and a connector 120. The docking device part contains a docking device charger 140, a docking device battery 142, a docking device diode 144, and a docking device 146. The main device part is able to operate by itself without the docking device part, and can be connected to the docking device part via the connector 120 to provide extended functions. The dockable device 1 may be a detachable tablet computer, a dockable laptop, or other dockable portable devices.

The main device part and the docking device part contain separate batteries. In a discharging mode, the main device charger 100 and the docking device charger 140 do not supply power to the main device battery 102 and the docking device battery 142. When the main device part operates by itself, the main device battery 102 independently supplies power to the main device 110. When the main device part and the docking device part are connected in operation, the docking device battery 142 can firstly provide power to the main device 110 until all battery capacity is used up, then the main device battery 102 can take over to supply power to the main device 110. Regardless of the main device part and the docking device part being attached or detached, the dockable device 1 can provide power to the main device 110 through the voltage down-converter 108, to prevent from a sudden loss of power during being attached or detached.

The voltage down-converter 108 is coupled to the main device battery 102, and down-converts the output voltage of the main device battery 102 to generate a backup voltage, wherein the backup voltage is less than a discharge voltage when the main device battery 102 is completely discharged. The main device battery 102 may be a 2-pack, 3-pack, or other numbers of packs of battery packages. For example, if a fully-charged voltage of a 1-pack battery is 4.2V, and a discharged voltage is 3V, then a fully-charged voltage of a 2-pack battery is 8.4V, and a discharged voltage thereof is 6V. The voltage down-converter 108 can down-convert the output voltage of the main device battery 102 to 5.9V, lower than the discharged voltage 6V of the 2-pack battery. In another example, a fully-charged voltage of a 3-pack battery is 12.6V, and a discharged voltage thereof is 9V. The voltage down-converter 108 can down-convert the output voltage of the main device battery 102 to 8V, lower than the discharged voltage 9V of the 3-pack battery. The voltage down-converter 108 may be a buck converter or a Single-ended Primary Inductor Converter (SEPIC).

When the docking device part is connected to the connector 120 and the docking device battery 142 has not fully used up, the main device 110 can obtain power from the docking device battery 142. When the docking device part is not connected to the connector 120 or the docking device battery 142 is used up, the main device 110 can obtain power from the main device battery 102. The dockable device 1 determines a status of the docking device part by a signal D_BAT, which represents the battery capacity of the docking device battery 142. When there is still capacity left in the docking device battery 142, the signal D_BAT will indicate 1; when there is substantially no capacity left in the docking device battery 142, the signal D_BAT will indicate 0. When the docking device part is connected to the connector 120, the connector 120 can send the signal D_BAT to the switch circuit 104 to control the main device part for the main device battery 102 to provide or stop providing power to the main device. When the signal D_BAT indicates that there is substantially no capacity left in the docking device battery 142, the switch circuit 104 will be closed to provide power to the main device 110 from the main device battery 102. When the docking device part is not connected to the connector 120, the signal D_BAT also indicates 0, and concurrently, the switch circuit 104 will be closed to provide power to the main device 110 from the main device battery 102.

When the dockable device is powered on, a signal PWR_ON is switched to a fixed voltage, such as "+5V", to enable the voltage down-converter 108 to parallel output power with the backup voltage to the main device 110, preventing the main device part and the docking device part from causing a sudden power failure during plugging or unplugging in the power-on state. On the other hand, when the dockable device 1 is turned off or in a power state S5 mode, the signal PWR_ON is "0V", to disable the voltage down-converter 108. That is, the voltage down-converter 108 is active only when the dockable device 1 is powered on, and is inactive without consuming power when the dockable device 1 is powered off or in the power state S5 mode. As a result, the voltage down-converter 108 consumes a standby power loss at a level of only several 10 microamperes (μA) and the main device battery 102 provides power to the system without being through the voltage down-converter 108. In other words, if the standalone tablet has a standby time of 30 days in the S5 mode, then the main device part and the docking device part in combination will have a standby time of nearly 60 days in the S5 mode.

Figure 2:
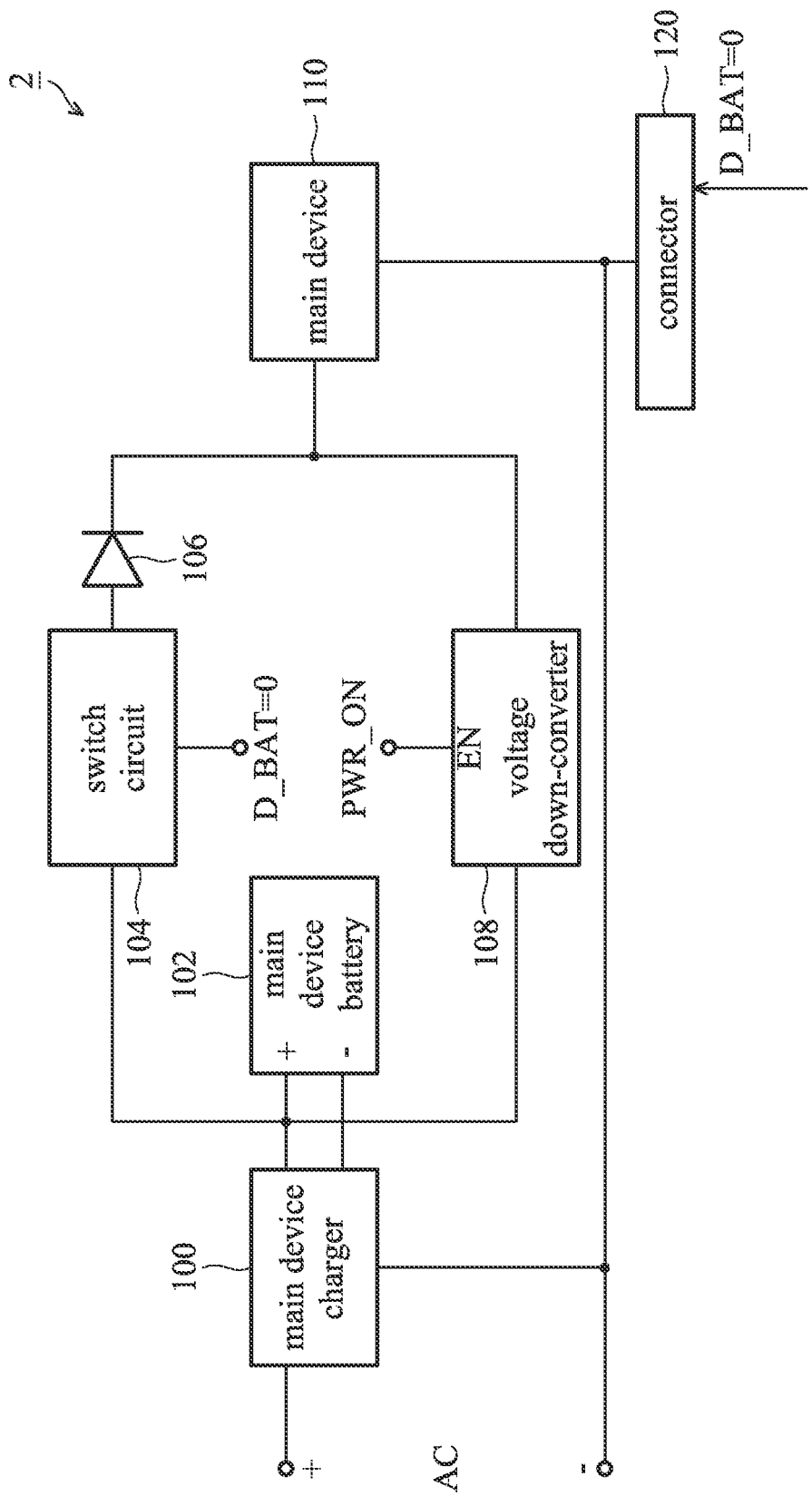
FIG. 2 is a schematic diagram of a dockable device 2 which operates alone according an embodiment of the invention.

Please refer to FIG. 2, illustrating a schematic diagram in which the main device part operates alone. Since the docking device part is not connected to the connector 120, the signal D_BAT is 0, and the switch circuit 104 is closed to provide power to the main device 110 from the main device battery 102.

The main device 110 can acquire power from an upper circuit path which includes the switch circuit 104 and the main device diode 106 or a lower circuit part which includes the voltage down-converter 108. Since the backup voltage output from the voltage down-converter 108 is less than the voltage output from the main device diode 106, when the main device battery 102 still has the battery capacity, power will be provided to the main device 110 only through the upper circuit path, and not through the voltage down-converter 108. In this way, when the main device 110 is in operation, the power conversion loss arising from the down-converter 108 can be prevented from, and heat dissipation can be reduced.

For example, when the main device battery 102 is in a 2-pack package, the output voltage output from the voltage down-converter 108 is configured to be 5.9V, which is lower than the voltage (6V) output from the fully discharged main device battery. In the configuration, the battery provide power to the main device 110 only from the upper circuit path, thereby being prevented from the power conversion loss due to the voltage down-converter and reducing the heat dissipation when the main device 110 is in operation. Similarly, when the main device 110 is in operation, the signal PWR_ON acts as a 5V output to enable the voltage down-converter 108. In this way, a power of 5.9V is parallel supplied to the dockable device 1 at all time, to prevent from a sudden loss of power and system shutdown during connecting or disconnecting the main device part and the docking device part in the power-on state. Conversely, when the main device 110 is powered off or in the S5 mode, the signal PWR_ON acts as a 0V output to disable the voltage down-converter 108, reducing the conversion loss due to the voltage down-converter and the heat dissipation. In another example, the main device battery 102 is a 3-pack battery, because the output voltage of the voltage down-converter 108 is set at 8V, lower than the voltage of a fully discharged 3-pack battery, in this configuration, the battery can provide power to the main device 110 only from the upper circuit path.

Returning to FIG. 1, when the main device part and the docking device part are docked together, the signal D_BAT is 1 or the voltage output by the docking device battery 142, the switch circuit 104 will not conduct signals, thus the main device battery provides power to the main device 110 through the voltage down-converter 108, and the docking device battery 142 concurrently provides power to the main device 110. Since the backup voltage output from the voltage down-converter 108 is less than the discharge voltage output by a fully discharged docking device battery 142, the docking device battery 142 will provide power to the main device 110 firstly, and then the main device battery 102 continues to provide power after the docking device battery 142 is fully discharged. Moreover, because the voltage output by the docking device battery 142 is 0V, the signal D_BAT is also 0V, which in turn cause the switch circuit 104 to be turn on, consequently the main device battery 102 will discharge power to the main device 110. The discharge path follows the same principle as that in the standalone main device part.

If the user plugs/unplugs the main device part from the docking device part in the power-on state, because the voltage down-converter 108 continuously provides the backup power to the main device 110, thus the main device 110 will not experience a sudden loss of power.

Table summarizes all operation modes discussed in the preceding paragraphs:

TABLE 1

| | PWR_ON | D_BAT | Switch circuit 104 | Voltage of the voltage down-converter 108 | Voltage to the main device 110 |
|---|---|---|---|---|---|
| Only the main device part | 1 | 0 | Conductive | 8 V/5.9 V | Voltage of the main device battery 102 |
| | 0 | 0 | Conductive | 0 V | Voltage of the main device battery 102 |

TABLE 1-continued

| | PWR_ON | D_BAT | Switch circuit 104 | Voltage of the voltage down-converter 108 | Voltage to the main device 110 |
|---|---|---|---|---|---|
| Docked | 1 | 0 | Conductive | 8 V/5.9 V | Voltage of the main device battery 102 |
| | 1 | 6~12.6 V | Non-conductive | 8 V/5.9 V | Voltage of the docking device battery 142 |
| | 0 | 0 | Conductive | 0 V | Voltage of the main device battery 102 |
| | 0 | 6~12.6 V | Non-conductive | 0 V | Voltage of the docking device battery 142 |

It can be observed from Table 1:

When the main device part and the docking device part are docked in the power-on state, the docking device battery 142 provides power to the main device 110 when there is battery capacity, and the main device battery 102 provides power to the main device 110 through the switch circuit 104 when the docking device battery 142 uses up all battery capacity, the voltage down-converter 108 is enabled throughout.

When the main device part and the docking device part are docked in power-off state, the docking device battery 142 provides power to the main device 110 when there is battery capacity, and the main device battery 102 provides power to the main device 110 through the switch circuit 104 when the docking device battery 142 uses up all battery capacity, the voltage down-converter 108 is disabled throughout.

When the main device part and the docking device part are undocked and the standalone main device part is in the power-on state, the main device battery 102 provides power to the main device 110, while the voltage down-converter 108 is enabled throughout.

When the main device part and the docking device part are undocked and the standalone main device part is in the power-off state, the main device battery 102 provides power to the main device 110, while the voltage down-converter 108 is disabled throughout.

Figure 3:
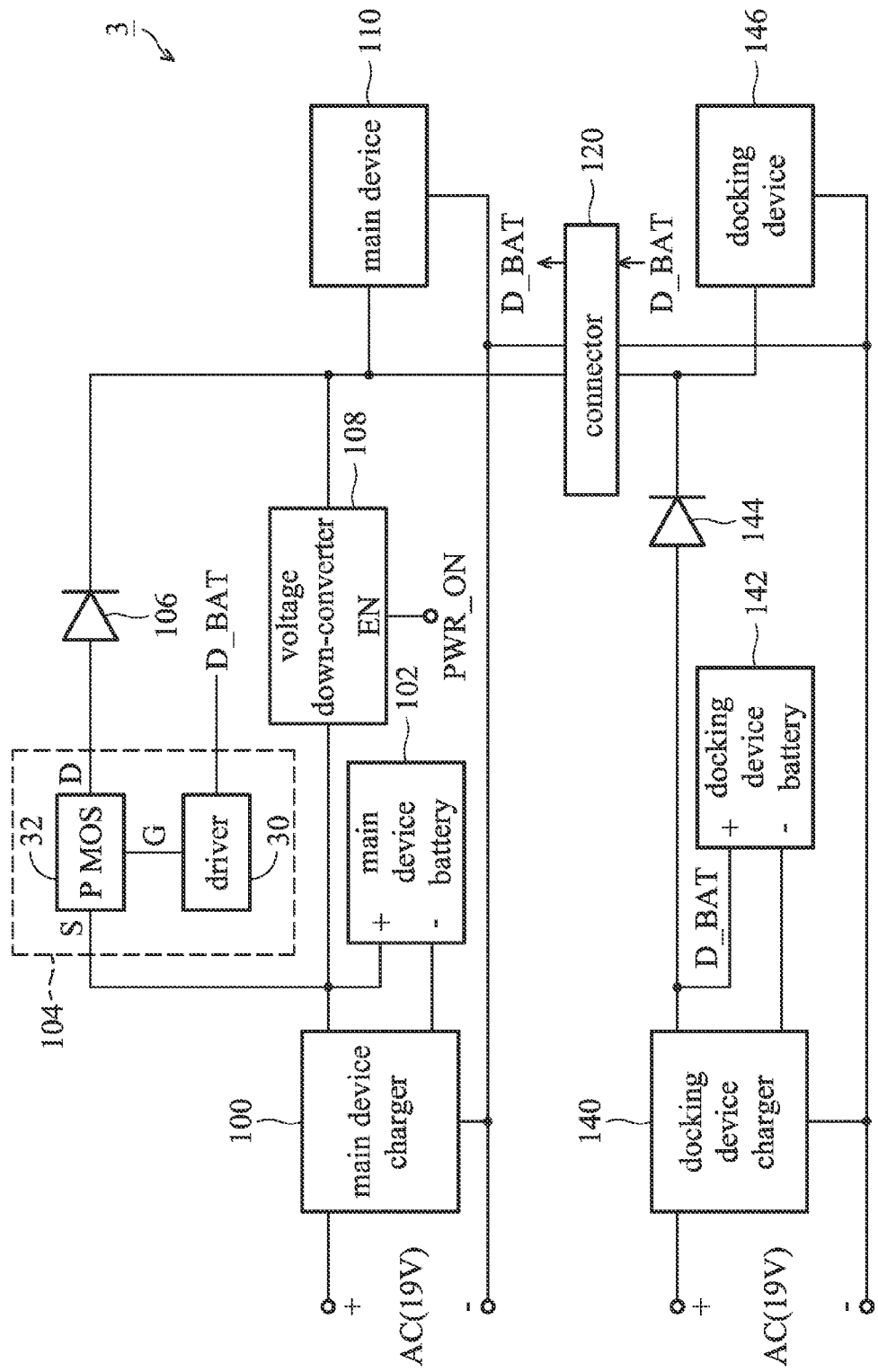
FIG. 3 is a block diagram of a dockable device 3 according to another embodiment of the invention.

FIG. 3 is a block diagram of a dockable device 3 according to another embodiment of the invention. FIG. 3 and FIG. 1 are different in that FIG. 3 discloses an implementation of the switch circuit 104. The switch circuit 104 includes a driver 30 and a PMOS transistor 32. When the main device part and the docking device part are docked and the docking device battery 104 has the battery capacity, the driver 30 is configured to receive a non-zero D_BAT signal to turn on the PMOS transistor 32, thereby cutting off the upper circuit path and stopping providing power from the main device battery 102. Conversely, when the main device part and the docking device part are undocked, the driver 30 is configured to receive the signal D_BAT as zero to turn off the PMOS transistor 32, thereby connecting the upper circuit path and providing power from the main device battery 102.

In the discharging mode, the dockable devices in FIGS. 1 through 3 utilize the voltage down-converter 108 and the switch circuit 104 to provide power to the system from the docking device battery 142 without using a controller until the battery is fully discharged, then switch to the main device battery 102 for providing power to the main device 110. Concurrently, a backup power is supplied to the main device 110 to prevent the sudden loss of power when a user plugs or unplugs the main device part from the docking device part in the power-on state, thereby improving the power efficiency of the battery, increasing the battery life and reducing the thermal issue in the operating system.

Figure 4:
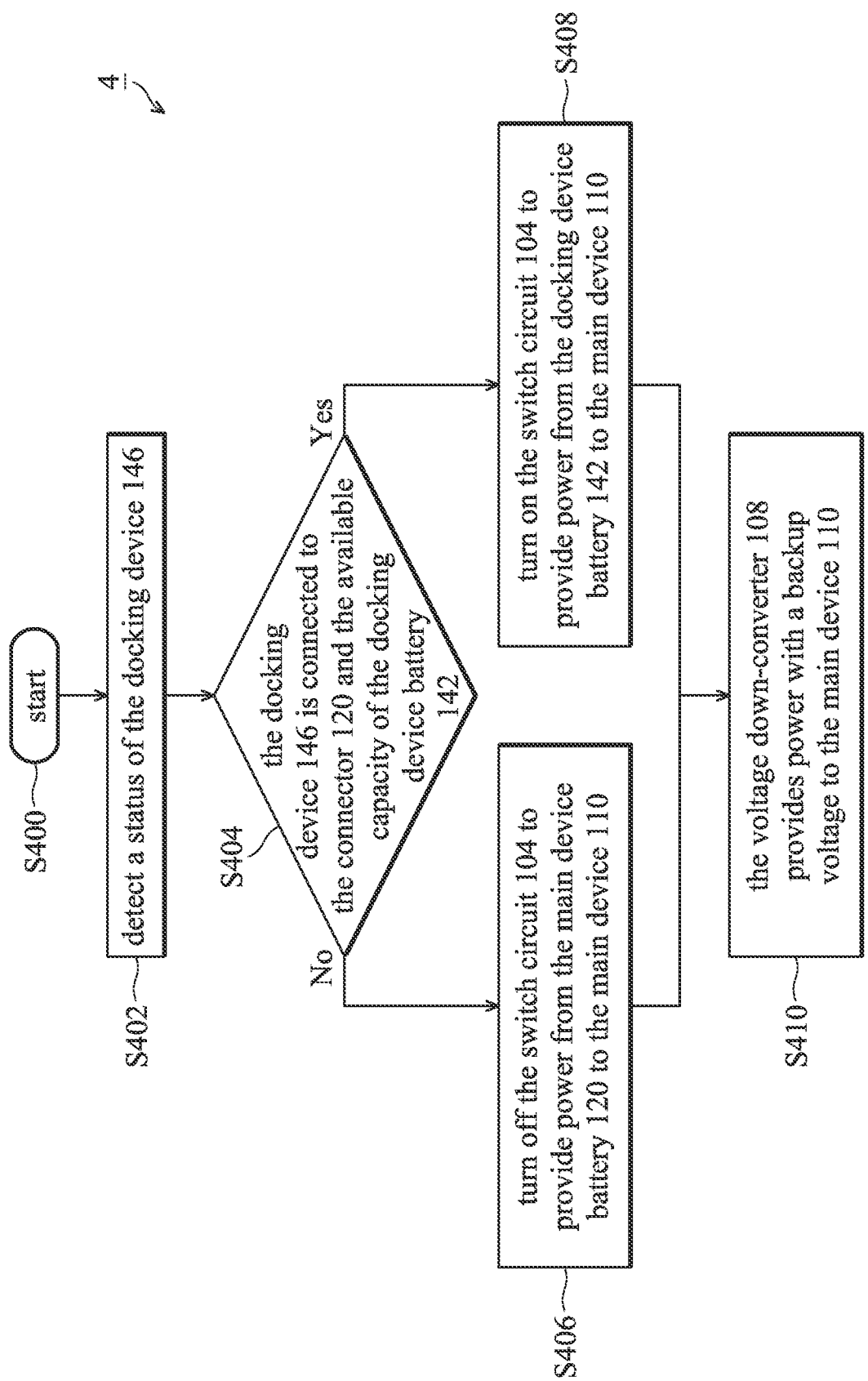
FIG. 4 is a flowchart of a power method 4 according to an embodiment of the invention.

FIG. 4 is a flowchart of a power method 4 according to an embodiment of the invention, incorporating the dockable device 1 in FIG. 1.

Upon startup of the power method 4, the dockable device 1 is in operation and in the discharging mode (S400). Next, the switch circuit 104 detects the status of the docking device 146 (S402). The status of the docking device 146 is represented by the signal D_BAT, indicating whether the docking device 146 is connected to the connector 120 and the battery capacity of the docking device battery 142 of the docking device 146.

The switch circuit 104 is configured to connecting or disconnecting power from the main device battery 102 based on the status of the docking device 146 (S404). When the docking device 146 is connected to the connector 120 and the docking device battery 142 still has available battery capacity, the switch circuit 104 is configured to be opened to disconnect power form the main device battery 102 to the main device 110, so that the docking device battery 142 can supply power to the main device 110 (S408). When the docking device 146 is disconnected from the connector 120 or the docking device battery 142 has no available battery capacity, the docking device battery 142 cannot supply power to the main device 110, thus the switch circuit 104 is configured to be closed to connect power form the main device battery 102 to the main device 110 (S406).

Whether the dockable device 1 acquire power from the main device battery 102 or the docking device battery 142, the voltage down-converter 108 is configured to provide power to the main device 110 with the backup voltage (S410), preventing from a sudden power loss of the main device battery 102 or the docking device battery 142 caused by a user plugs or unplugs the main device part from the docking device part. The backup voltage is less than a discharge voltage provided by a fully discharged main device battery 102 or docking device battery 142. In some embodiments, the voltage down-converter 108 is configured to generate the backup voltage when the dockable device 1 is in operation. When the dockable device 1 is powered off or in the S5 power state, the voltage down-converter 108 is disabled and stops providing the backup voltage. By doing this the conversion loss and the thermal issue caused by the voltage down-converter 108 can be reduced.

The power method 4 in the discharging mode utilizes the voltage down-converter 108 and the switch circuit 104 to provide power to the system from the docking device battery 142 until the battery is fully discharged, without using a controller, then switch to the main device battery 102 for providing power to the main device 110. Concurrently, a backup power is supplied to the main device 110 to prevent the sudden loss of power when a user plugs or unplugs the main device part from the docking device part in the power-on state, thereby improving the power efficiency of the battery, increasing the battery life and reducing the thermal issue in the operating system.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, processor, microprocessor or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dockable device system, comprising:
   a docking device having a docking device battery;
   a main device comprising:
   a main device battery;
   a connector for mating with the docking device;
   a switch, coupled between the main device battery and the main device, providing a first power path to the main device; and
   a voltage down-converter, configured to provide the main device with a backup voltage via a second power path to the main device when the main device is in a power-on state, and the voltage down-converter further configured to not provide the main device with the backup voltage via the second power path when the main device is not in the power-on state,
   wherein the backup voltage is less than a discharge voltage output by a fully discharged main device battery,
   wherein the backup voltage is less than a discharge voltage output by a fully discharged docking device battery,
   wherein the switch is configured to be open when the main device is connected to the docking device and the docking device battery is not in a discharged state thereby disconnecting the first power path, wherein the switch is configured to be closed and provide power to the main device via the first power path either
   when the main device is not connected to the docking device or when the main device is connected to the docking device but the docking device battery is in a discharged state,
   wherein when the main device is in the power-on state, the main device is connected to the docking device, and the switch is open, the voltage down-converter and the docking device battery concurrently provide power to the main device via the second power path and the third power path.

2. The dockable device system of claim 1, wherein when the connector is connected to the docking device and the docking device battery of the docking device has available battery capacity, the switch is configured to be opened thereby disconnecting the first power path and providing power to the main device from the docking device battery via a third power path.

3. The dockable device system of claim 1, wherein when the connector is not coupled to the docking device or the docking device battery of a connected docking device is fully discharged, the switch is configured to be closed according to a docking device capacity signal to provide power to the main device from the main device battery.

4. A power method, adopted by a dockable device system, wherein the dockable device system comprises a docking device having a docking device battery and a main device dockable to the docking device, the power method comprising:
   detecting whether a connector has been coupled to the docking device;
   providing the main device with power from a main device battery via a first power path when the main device is in a power-on state;
   providing the main device with a backup voltage, by a voltage down-converter, to the main device via a second power path when the main device is in power-on state, but not providing the main device with the backup voltage when the main device is not in the power-on state, wherein the backup voltage is less than a discharge voltage output by a fully discharged main device battery, wherein the backup voltage is less than a discharge voltage output by a fully discharged docking device battery,
   opening a switch to disconnect the first power path, when the main device is connected to the docking device and the docking device battery is not in a discharged state, thereby providing power to the main device via a third power path;
   closing the switch to connect the first power path either when the main device is not connected to the docking device or when the main device is connected to the docking device but the docking device battery is in a discharged state,
   wherein when the main device is in the power-on state and the main device is connected to the docking device, the voltage down-converter and the docking device battery concurrently provide power to the main device via both the second power path and third power path.

5. The power method of claim 4, wherein when the connector is connected to the docking device and the docking device battery of the docking device has available battery capacity, opening the switch thereby disconnecting the first power path and providing power to the main device from the docking device battery via the third power path.

6. The power method of claim 4, wherein when the connector is not coupled to the docking device or the docking device battery of a connected docking device is fully discharged, closing the switch according to a docking device capacity signal to provide power to the main device from the main device battery.

* * * * *